United States Patent
Philbert

[11] 4,013,366
[45] Mar. 22, 1977

[54] METHOD AND APPARATUS FOR INVESTIGATION OF SMALL DISPLACEMENTS OF A SOLID BODY BY MEANS OF COHERENT LIGHT

[75] Inventor: Michel Eric Philbert, Paris, France

[73] Assignee: Office National d'Etudes et de Recherches Aerospatiales (O.N.E.R.A.), Chatillon, France

[22] Filed: Aug. 20, 1975

[21] Appl. No.: 606,324

Related U.S. Application Data

[63] Continuation-in-part of Ser. No. 467,074, May 6, 1974, abandoned.

[30] Foreign Application Priority Data

May 23, 1973 France .............................. 73.18751

[52] U.S. Cl. ..................... 356/106 R; 73/67.5 R
[51] Int. Cl.² ......................................... G01B 9/02
[58] Field of Search ................ 356/106 R, 113; 73/67.5 R, 67.6, 67.7, 88 A; 350/3.5

[56] References Cited

UNITED STATES PATENTS 3,632,214   1/1972   Chang et al. .................. 356/106 R

OTHER PUBLICATIONS

Archbald et al., "A Laser Speckle Interferometer . . . Vibration" *Optical Instruments and Techniques*, ed. Dickson, Oriel Press Oct. 1970, pp. 265–275.

*Primary Examiner*—John K. Corbin
*Assistant Examiner*—Conrad Clark
*Attorney, Agent, or Firm*—Morse, Altman, Oates & Bello

[57] ABSTRACT

Method and apparatus for monitoring the vibratory displacements of a diffusing or reflecting solid body which in a preferred application is a turbine blade. A laser source of rectilinearly polarized monochromatic light provides a laser beam which is directed at the solid body. The beam reflected off the body is directed toward a first photocell with a photomultiplier along with part of the incident laser beam. Part of the reflected beam is directed toward a second photocell with a photomultiplier A Kerr or Pockels cell varies the intensity of the laser beam in response to the output current strength from the second photocell to maintain the lighting of the first photocell constant regardless of the presence of speckle phenomenon. Apertures are arranged in front of the photocells and sufficiently small, e.g. one tenth the diameter of the grains of materials of the solid body, so that the lighting of the first photocell may be considered constant at all points. A pulse counter is arranged after the first photomultiplier, and an inverter is disposed between the second photomultiplier and the Kerr or Pockels cell.

5 Claims, 6 Drawing Figures

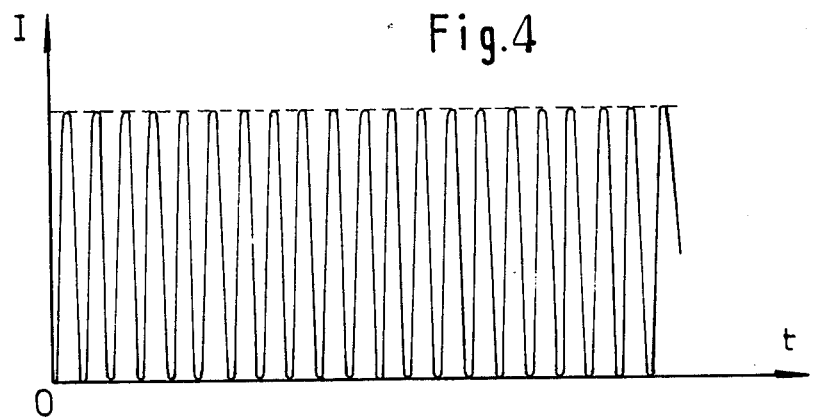
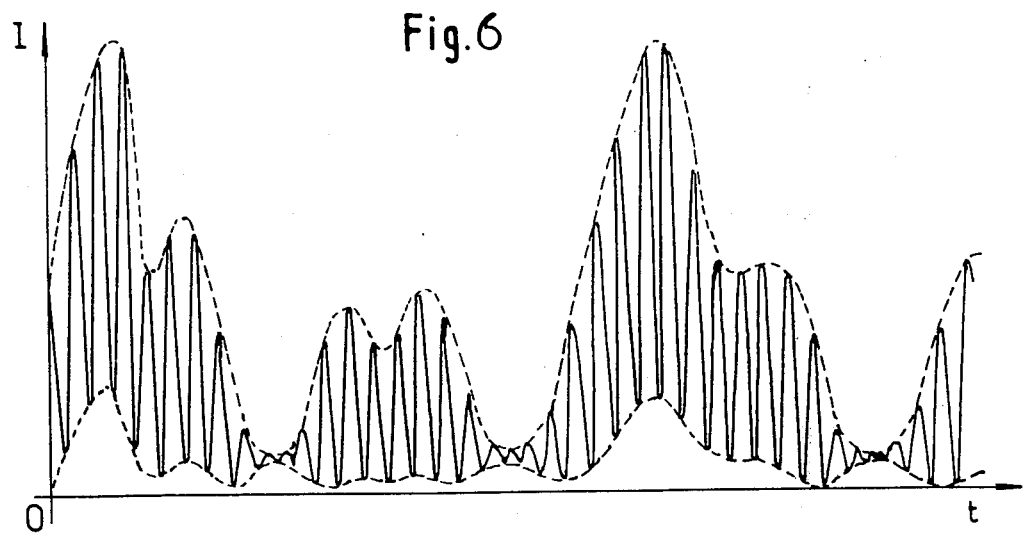
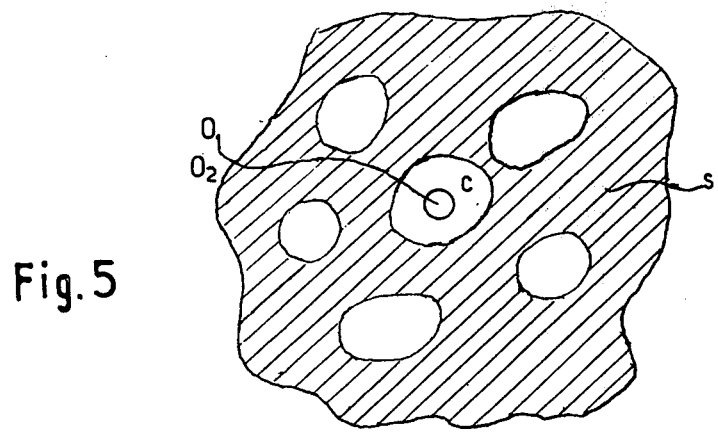

METHOD AND APPARATUS FOR INVESTIGATION OF SMALL DISPLACEMENTS OF A SOLID BODY BY MEANS OF COHERENT LIGHT

The present application is a continuation-in-part of patent application Ser. No. 467,074, filed on May 6, 1974 now abandoned.

The invention relates to a method and an apparatus for monitoring small displacements of a solid body by means of coherent light.

It has been contemplated to monitor such small displacements of a solid body by aiming at the same a beam of coherent light and by counting passing interference fringes corresponding to the displacement of the body at a point situated in a beam reflected off the body as well as in a beam originating directly from the source of coherent light.

Practical uses of this method have not, however, been possible till now. In point of fact, the method apparently requires that the surface of the solid body should have reflective qualities similar to those of a mirror and that the portion of the solid body reflecting the beam of coherent light should be of sufficiently small size to be considered a point.

These two conditions are not fulfilled in practice.

In fact, the part of a body whose displacements are to be monitored and which is struck by the beam of coherent light is not a point and is not a perfect mirror so that the diffusion of the coherent light on the part produces, at the viewing point, the appearance of a parasite phenomenon known as the "speckle effect or phenomenon" which prevents the use of interference with the beam coming directly from the reference source or beam.

According to the invention, use is made of the parasite phenomenon to affect the light striking the body so as to compensate at all times for the speckle phenomenon so that the interference fringes of the reflected beam with the reference beam may be monitored under the same conditions as when the body to be monitored has mirrorlike reflective qualities.

One aspect of the invention comprises the steps of producing in a zone other than the viewing or observation zone, a speckle phenomenon from the diffused beam of coherent light, and affecting the intensity of the light striking the body in correspondence of the speckle phenomenon in order to compensate at all times for variations resulting therefrom.

In the description which follows, given by way of example, reference is made to the accompanying drawing, in which:

FIG. 4 is a graphic plotting current strength versus time;

FIG. 5 is a schematic representation of the speckle effect;

FIG. 6 is another graphic plotting current strength versus time.

Figure 1:
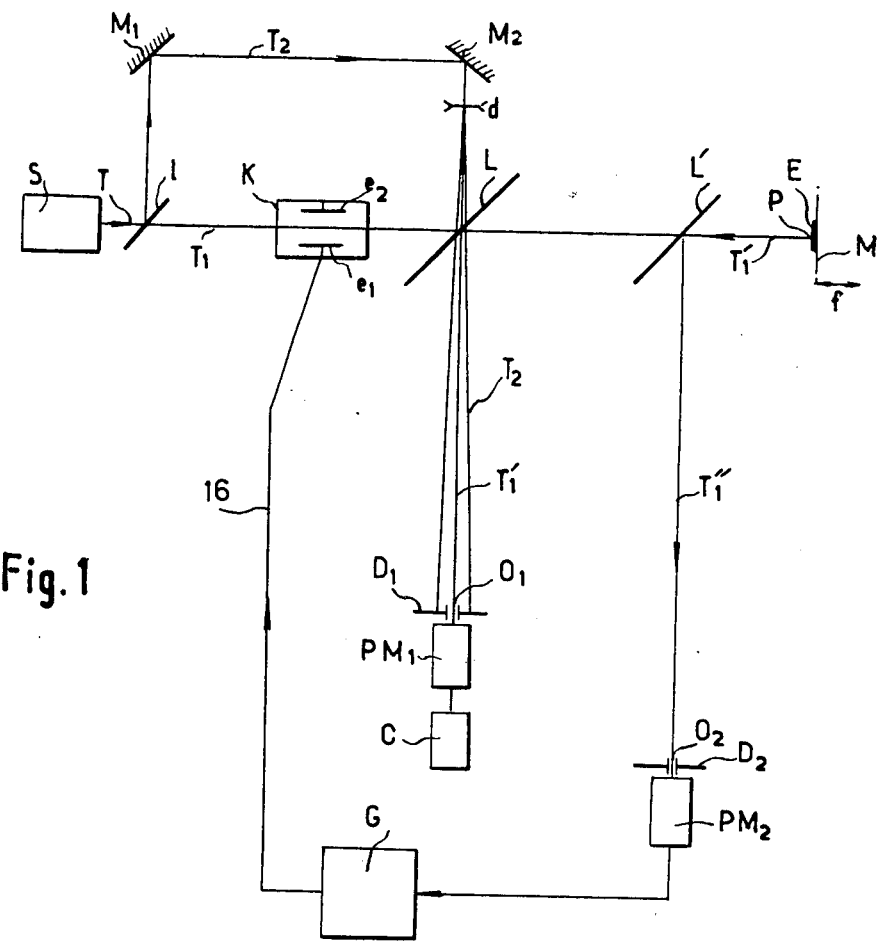
FIG. 1 is a schematic view of an arrangement or apparatus according to the invention.

S is a laser source which provides a beam T (FIG. 1) of recti-linearly polarized monochromatic light. The beam T falls on a transparent reflecting plate 1. The part $T_1$ of the beam T that passes through the plate 1 constitutes the test beam and the reflected part $T_2$ constitutes the reference beam. The test beam $T_1$ passes through an electro-optical modulator K which is a Kerr cell or a Pockels cell.

In case a Pockels cell is used, the modulator comprises a crystal 11 (FIGS. 2 and 3) with the incident face 12 perpendicular to the axis 13 of the beam $T_1$. The crystal 11 is oriented so that the polarization direction V of the coherent light carried by the beam $T_1$ is at 45° to the vectors $V_X$ and $V_Y$ associated with the crystal, corresponding to its crystallographic axis, sometimes known respectively as the fast and slow axis. The crystal 11 is followed by a linear polarizer 14 whose direction of polarization 15 is parallel to the polarization direction V.

Figure 2:
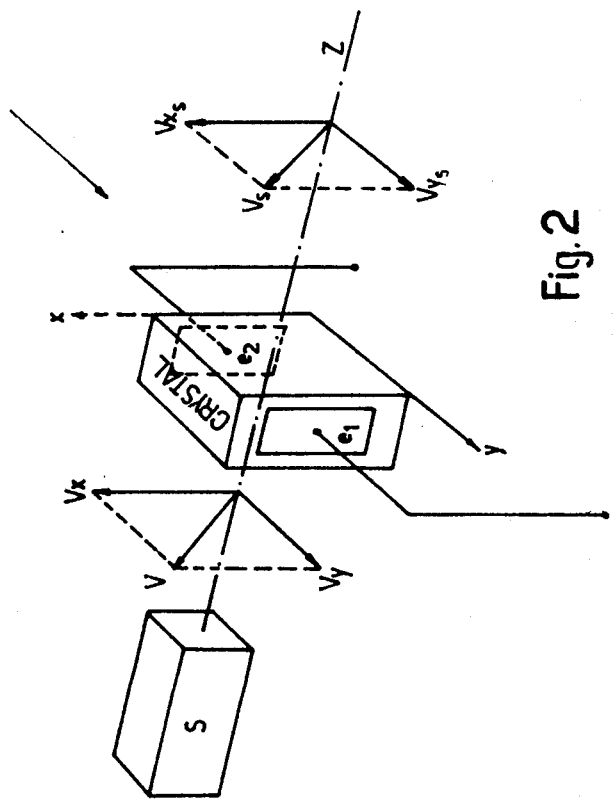
FIG. 2 is a schematic view of part of the arrangement.

The modulator comprises two electrodes $e_1$ and $e_2$ cooperating with the crystal 11. As is known, when there is no potential difference between the electrodes $e_1$ and $e_2$, the crystal 11 is devoid of any double refraction for a propagation taking place along the Z axis which is perpendicular to the incident and exit faces. The components $V_X$ and $V_Y$ of the luminous vibration projected on the X— and Y— axes are then propagated at the same speed in the crystal, combining together when they emerge from the crystal as a vibration $V_s$ having the same polarization as that of the incident vibration (FIG. 2).

Figure 3:
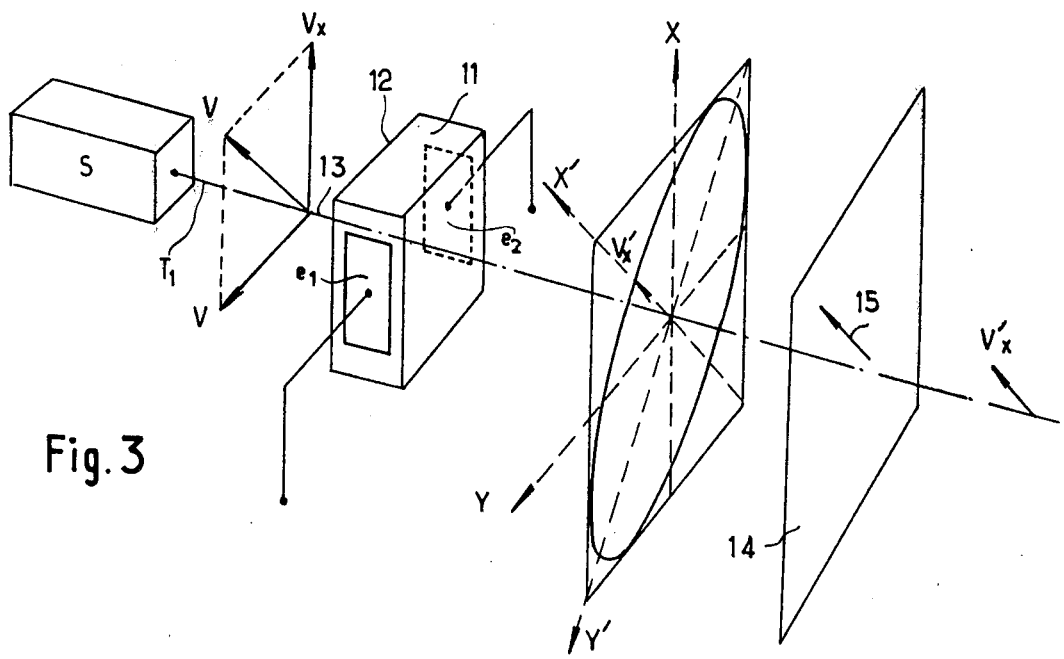
FIG. 3 is a view similar to that of FIG. 2 but gives additional information.

If, on the other hand, a potential difference is applied at the electrodes $e_1$ and $e_2$, the crystal becomes double refractive or birefringent: the components $V_X$ and $V_Y$ of the vibration are propagated in the crystal at different speeds. These components therefore emerge from the crystal with a phase difference proportional to the applied potential difference. Consequently, at the emergent side or face, there is an elliptically polarized vibration whose axes $X'$ and $Y'$ are respectively parallel and perpendicular to the polarization direction of the incident light (FIG. 3).

The polarizer 14 oriented along the X-axis then selects the component $V'_X$ of the elliptical vibration projected onto the $X'$ axis. As the component $V'_X$ is parallel to the incident vibration, the beam of light emerging from the polarizer 14 enables the measure after interference with the reference vibration. The amplitude of the $V'_X$ component will depend in size on the phase difference produced by the crystal, therefore on the electric current applied at the electrodes $e_1$ and $e_2$.

The test beam T then passes through a transparent reflecting plate L and a transparent reflecting plate L' and falls as a point P on and perpendicular to the solid body M whose displacements are to be measured. The monitored body M is, for instance, a turbine blade subjected to the action of a vibration excitation represented by the double-beaded arrow $f$ the displacements of point P being not necessarily restricted only to translations but can eventually comprise a rotation.

The beam $T'_1$ diffused at the "point" P passes through the plate L' in a direction opposite to the direction of the beam $T_1$ and is reflected onto the plate L along the so-called test beam $T'_1$. The test beam falls on aperture $O_1$ of a stop or diaphragm $D_1$ positioned in front of a photomultiplier $PM_1$. The reference beam $T_2$ originating from the beam T provided by the laser after reflecting off the plate 1 to a first mirror $M_1$, to a second mirror $M_2$ and then through a lens $d$ and the plate L also falls on the aperture $O_1$.

Part of the beam $T'_1$ diffused by the solid body M at point P is in addition reflected by the plate L' along a beam $T''_1$ which falls on the aperture $O_2$ of a second stop or diaphragm $D_2$ positioned in front of a second photomultiplier $PM_2$ at the same optical position with respect to point P as the diaphragm $D_1$. The size of the aperture $O_2$ of the diaphragm $D_2$ is selected to be sufficiently small in order to be less than that of the image of a grain or spot of the speckle figure, so that the lighting of the aperture $O_2$ may thus be considered constant.

The voltage delivered by the second photomultiplier $PM_2$ is supplied to an inverter (amplifier) G whose output provides the potential difference which is delivered to the electrodes $e_1$ and $e_2$ via circuit 16.

If the solid body M has a perfectly homogeneous structure at the point P, i.e., if the zone on which the laser beam $T_1$ falls has a uniform reflective power, then the interference at the aperture $O_1$ of the test beam $T'_1$ of the diaphragm $D_1$ with the reference beam $T_2$ of uniform amplitude, would provide, during vibration of the body M, by means of the photomultiplier $PM_1$, a current whose amplitude is represented as a function of time in the schematic curve shown in FIG. 4.

An electronic pulse counter C connected to the photomultiplier $PM_1$ and counting the rising ramps by means of, for example, a trigger threshold adjusted to the middle of the ramps can yield information as to the movement of the zone P of the body M.

But owing to the inevitable granular structure of the constituent material of the solid body M, there is produced on diaphragm $D_1$ in the vicinity of the aperture $O_1$, disregarding the interference with the reference beam $T_2$, a variation in lighting resulting from the speckle phenomenon. If, for instance, at a predetermined point in time a light speckled or spotted zone is superimposed at the aperture $O_1$ (FIG. 5), the vibration of the body M in lateral translation and/or rotation will cause the spotted or speckled zone to be displaced with respect to the aperture $O_1$, and facing the aperture $O_1$, more or less light or dark zones in correspondence with the configuration of the speckle zone will move by. The differences in lighting resulting from the speckle fringe phenomenon would modulate the amplitude of the fringes caused by the interference of the test beam with the reference beam as shown on FIG. 6, hence rendering the interference phenomenon unusable by the counter C.

Now the speckle which is formed on the diaphragm $D_2$ is identical to that formed on the diaphragm $D_1$; during the vibration of the solid body M, the spotted zone passes in front of the aperture $O_2$ in the same manner as the spotted zone passes in front of the aperture $O_1$, a fact which has been indicated on FIG. 5 by adjunction of reference $O_2$. Variations in current at the output of the photomultiplier $PM_2$ resulting from the speckle phenomenon on the diaphragm $D_2$ are the same as the current variations at the output of the photomultiplier $PM_1$ resulting from the speckle phenomenon alone on the diaphragm $D_1$.

If, for example, during vibration, the lighting of the aperture $O_2$ tends to diminish, the inverter (amplifier) G gives rise to potential difference between the electrodes $e_1$ and $e_2$ to increase the intensity of the test light beam $T_1$ emerging from cell K and polarizer 14 in order to compensate for this decreased lighting. By means of the feedback control loop which comprises the photomultiplier $PM_2$, the inverter (amplifier) G, the cell K, and the test beam $T_1$, $T''_1$, the lighting value in the aperture $O_2$ of the diaphragm $D_2$ remains constant. As the lighting variations of the aperture $O_1$ resulting from the speckle phenomenon are the same as those of the aperture $O_2$, the lighting variations of aperture $O_1$ resulting from the speckle are thus eliminated so that the photomultiplier $PM_1$ is affected only by the lighting variations resulting solely from the interference of the reflected beam $T'_1$ with the reference beam $T_2$. Thus, the effect of the displacement of the speckle figure on the photomultiplier $PM_1$ is suppressed and the number of pulses counted by the counter C associated with the photomultiplier $PM_1$ corresponds to the number of fringes which passes in front of the aperture $O_1$ as a function of the movement of the zone P of the solid body M as results from the interference between the test beam $T'_1$ and the reference beam $T_2$.

The aperture $O_1$ of the diaphragm has the same diameter as the aperture $O_2$ and is in a position such that it is covered by the same zone of the spotted image.

In the absence of the compensation provided by the photomultiplier $PM_2$ and the modulator or cell K the output current strength produced by the photomultiplier $PM_1$ would be as shown in the graph of FIG. 6 which would not render the information or count of the counter C significant with regard to the interference fringes of the test beam and the reference beam. The function of the photomultiplier $PM_2$, the inverter (amplifier) G and the modulator or cell K is therefore to obtain an output current strength of the photomultiplier $PM_1$ which is as shown in the graph of FIG. 4 whereby the number of interference fringes may be easily counted by the counter C.

Thus the invention allows the vibration measurements of turbine blades although it concerns the bending and torsional deflections or displacements as well as the displacement of the "point" which is not in pure translation but combined with rotation.

What is claimed is:

1. A method for monitoring the vibrating displacements of a light diffusing solid body comprising, producing interference between part of a laser beam diffused by said body and another part of said laser beam, and controlling the intensity of the laser beam with a part of the laser beam diffused by said solid body in order to avoid the speckled image from said solid body produced by the diffused laser beam.

2. A method for monitoring the vibrating displacements of a light diffusing solid body, comprising the steps of generating a laser beam, dividing said laser beam into a study beam falling on the area of the solid body under investigation and into a reference beam, converging the study beam and the reference beam onto a photosensitive electric cell, counting the current pulses produced by said cell, deriving from said study beam a control beam, directing the control beam onto a second photosensitive electric cell and controlling the strength of the laser beam with said second cell.

3. Apparatus for monitoring the vibrating displacements of a light diffusing solid body, comprising a laser adapted to emit a laser beam, means for dividing said beam into a study beam and a reference beam, means for directing said study beam onto an area of the solid body to be investigated whereby a reflected diffused beam is produced, a first diaphragm in the path of said reference beam, means for projecting the diffused part of the study beam onto said first diaphragm, means for projecting said reference beam onto said first diaphragm, means for deriving from the diffused beam a control beam, a second diaphragm in the path of said control beam, means for directing said control beam onto said second diaphragm, a first photosensitive electric cell receiving the light going through the first diaphragm, a pulse counter associated with said first cell, a second photosensitive electric cell receiving the light going through said second diaphragm and means for controlling the intensity of the study beam with said second cell.

4. Apparatus, according to claim 3, wherein the dimension of the opening of the first diaphragm, and the dimension of the opening of the second diaphragm are small with respect to the mean dimension of a spot of the speckle corresponding to the image of the area of the solid body under investigation on the first and second diaphragms.

5. Apparatus, according to claim 3, wherein said laser provides a coherent linearly polarized light, said apparatus including a Pockels cells, a crystal and electrodes operatively connected to said cell, the study beam going through said Pockels cell before striking said solid body, an amplifier-inverter connected to said second photo-electric cell to receive as an input to said amplifier-inverter the output of said second cell, said amplifier-inverter being connected to said electrodes to provide an input thereto.

* * * * *